United States Patent [19]

Joosten et al.

[11] 4,218,767
[45] Aug. 19, 1980

[54] TRANSMISSION LINE SEISMIC COMMUNICATIONS SYSTEM

[75] Inventors: Wesley L. Joosten; Carl F. Mart, both of El Paso, Tex.; John W. Miller, White's City, N. Mex.; Otice E. Brown, El Paso, Tex.

[73] Assignee: Gus Manufacturing, Inc., El Paso, Tex.

[21] Appl. No.: 10,680

[22] Filed: Feb. 9, 1979

Related U.S. Application Data

[63] Continuation of Ser. No. 751,061, Dec. 16, 1976, abandoned, which is a continuation of Ser. No. 699,714, Jun. 25, 1976, abandoned, which is a continuation of Ser. No. 412,763, Nov. 5, 1973, abandoned.

[51] Int. Cl.² .......................... G01V 1/22; G01V 1/16
[52] U.S. Cl. ...................................... 367/79; 340/183; 370/91
[58] Field of Search ....... 367/79; 179/15 AL, 15 BA; 340/183; 325/38 B, 39

[56] References Cited

U.S. PATENT DOCUMENTS

| | | | |
|---|---|---|---|
| 2,406,165 | 8/1946 | Schroeder | 179/15 AL |
| 3,748,638 | 7/1973 | Montgomery | 340/15.5 MC |
| 3,851,302 | 11/1974 | Schmitt | 340/15.5 TS |
| 3,855,422 | 12/1974 | Cadiou et al. | 179/15 AL |
| 3,911,210 | 10/1975 | Suzuki et al. | 179/15 BA |
| 3,911,226 | 10/1975 | Angelli et al. | 179/15 AL |
| 3,924,077 | 12/1975 | Blakeslee | 179/15 AL |
| 3,938,073 | 2/1976 | Fort et al. | 340/15.5 TS |
| 4,001,769 | 1/1977 | Fort et al. | 340/15.5 TS |
| 4,017,799 | 4/1977 | Burdett et al. | 179/15 AL |

FOREIGN PATENT DOCUMENTS

| | | | |
|---|---|---|---|
| 812754 | 4/1959 | United Kingdom | 340/151 |
| 1042423 | 9/1966 | United Kingdom | 179/15 AL |
| 1051132 | 12/1966 | United Kingdom | 340/183 |

OTHER PUBLICATIONS

Glunder, "Rencote Control Installations for Signal Transmission Systems," 1958, pp. 591-592, 615-617, NTZ vol. 11.

*Primary Examiner*—Nelson Moskowitz
*Attorney, Agent, or Firm*—Hubbard, Thurman, Turner, Tucker & Glaser

[57] ABSTRACT

A seismic communications system including a central control and recording station and a plurality of remote data acquisition stations, the stations being approximately in line and connected to each other by one or two transmission lines. One line is all that is necessary if the central station is at one end of the line of stations; however, if the central station has some acquisition stations upstream and some downstream therefrom, two lines are required. Coded central strobe bursts put on a transmission line at the central station successively cause insertion of digital seismic data from successively more remote acquisition stations, the data being time slotted after each central station strobe burst so that reverse transmissions do not interfere with subsequent signal propagations emanating from the central station. Twin lead is preferably used for the transmission lines. Power shut down, except for a pilot receiver, is accomplished at each acquisition station between recording cycles.

7 Claims, 5 Drawing Figures

TRANSMISSION LINE SEISMIC COMMUNICATIONS SYSTEM

This is a continuation of co-pending application Ser. No. 751,061, filed Dec. 16, 1976, which is a continuation of application Ser. No. 699,714, filed June 25, 1976; which is a continuation of application Ser. No. 412,763, filed Nov. 5, 1973.

BACKGROUND OF THE INVENTION

1. Field of the Invention

This invention pertains to the collection and transmission of seismic data and more particularly to a unified data acquisition system wherein the seismic data conventionally collected via an array of seismometers is recorded at a central station facility.

2. Description of the Prior Art

In seismic surveying it is common practice to generate seismic waves by the detonation of explosives located either on or above the surface of the earth or in holes drilled in the earth. Alternatively, seismic waves may be imparted via mechanical vibrators. Upon detonation of the charge or the imparting of a mechanical disturbance, the waves generated thereby travel into the earth and are reflected back to the surface from layers thereof which may be interfaces between earth's strata. The reflections are detected by seismometers, or geophones, which convert the detected seismic waves into electrical signals suitable, when amplified, for recording. Each reflection adds waves to the normally uniform trace of the electrical output from the seismometer. It is from the visual inspection of traces made from these waves that geophysicists are able to obtain desired prospecting data.

It is conventional to develop simultaneous traces as received from multiple geophones spaced in a line at regular intervals. For example, 48 geophones may be spaced apart by about 500-foot intervals in a line along the terrain. A disturbance from a source also in the line with the geophones is then generated and the signals received from each of the geophones turned into 48 correlated traces. Additional data is obtained if the "shot points" (source locations of induced seismic disturbances) and the receipt of signals at the geophone stations are operationally advanced sequentially along the line. This is possible by providing for additional geophones and wiring for sequential electrical detonation or triggering of multiple sources or shots, a shot point being located in the near vicinity of each of the geophone stations. Sequential operation of the shots and detection stations provides seismic signals in so-called "roll along" fashion.

It is also common somewhere along the line of geophones to experience a terrain condition where it is difficult or impossible to position a geophone, even though regular interval spacing dictates placement. Hence, to obtain 48 traces (in a 48 trace system), it is necessary to skip the inaccessible location. This practice is referred to as "gapping".

Although the spacing intervals are normally on the order of about 500 feet, spacing intervals which are closer together or further apart than this are not unusual.

In operation, it is desirable to correlate the geophone responses with a particular source shock or vibration impulse. That is, a shock which is initiated is sent out from a particular location and is received, although not simultaneously, as a reflection by each of the individual geophones. These received signals are treated by delay circuits and in other regards well known in the art to achieve correlation. Since source occurrences are happening in periodic time sequence and from sequential locations, as above described, the received signals at the geophones may be mistakenly correlated unless there are long delays or unless there is suitable data handling to perform the required correlations. One way of assuring suitable handling without initiating induced delays is by centrally recording the signals from the variously positioned geophones, as opposed to separately recording the individual signals for later matching. Various means have been used or attempted for this purpose including using radio transmission, multiple wires (one from each geophone or an array of geophones to a central facility), one or more co-axial shielded cables (each cable having a sufficient bandwidth that together they are able to accommodate the frequency multiplexed signals from the geophones, as well as the control signals for triggering the sources and the like). All such transmission media to date have been fraught with one or more shortcomings.

Radio transmission requires expensive transmitters at each geophone, requires the use of frequency spectrum allocations for this purpose (in an already crowded spectrum), and is susceptible to variations in terrain and weather conditions that may have an effect on variation in quality of transmission from the various geophones. The quality effect may actually result in misinterpretation of the seismic data.

Stringing and moving multiple telephone wires to each geophone is cumbersome and time consuming. Moreover, keeping track of multiple wiring connections is inherently exacting and the possibility of making a mistake is large, even with highly qualified field crews. Hence, not only is having to cope with a large number of separate wires a nuisance, it is both a material and labor burden, introducing large possibility for error.

Use of one or more shielded cables and multiplexing equipment has proven operationally satisfactory. However, shielded cables having wide bandwidth characteristics and suitable for carrying a large number of multiplex signals are heavy and are expensive.

Therefore, it is a feature of this invention to provide an improved means for transmitting data from a plurality of seismometers or geophone stations to a central location over a relatively inexpensive single transmission medium.

It is another feature of this invention to provide an improved seismic data transmission means for carrying signals both to and from a central station and a plurality of seismometers or geophones in a time sharing manner, thereby minimizing bandwidth requirements of the medium.

It is still another feature of this invention to provide an improved seismic data transmission means operating in time-sharing fashion, the return signals from the seismometers or geophone stations each being timed by the same strobe signal sent out from a central control and recording station, the strobe signals synchronizing clocks at the seismometers or geophone stations to positively assure an absence of interference between signal insertions.

SUMMARY OF THE INVENTION

A preferred embodiment of the present invention comprises a transmission line of television-type, twin-lead strung between a control and data recording station and sequentially positioned remote data acquisition units (RDAU), each such unit being connected to a plurality of individual geophones or seismometers. The control station may be located somewhere in the middle of the string of RDAU stations; therefore, there may be an upstream and a downstream transmission line. Typically, there are 18 RDAU stations with three separate geophone channels (single geophone or an array) connected into each such station. This provides a capacity of 16 active RDAU stations, one RDAU station for providing "roll along" and one RDAU station for "gapping".

The coded strobe pulse sent from the control station may be coordinated with a particular signal for triggering a particular source so that the strobe pulse is identified with a particular "shot". This coded stroke pulse from the control station as it passes each successive RDAU station synchronizes the crystal clock located in the RDAU station and gates on in sequential time slot order a first set of simple memory units to record the data being received at the three geophone channel locations. This timing of the station memory units synchronizes the geophone responses with the particular shot. At the next strobe pulse, the first set of memory units are again gated on to insert the previously recorded data from this set of memory units onto the transmission line. At the same time a second set of memory units are gated on to record new data.

For convenience and simplicity, the signals from the three channels at the RDAU stations may be time multiplexed and digitized before recording.

The data insertions, being sequential, do not interfere with the strobe or with each other. Further, the timing is all with respect to the same strobe as it passes along the transmission lines one station to the next. Since there is new synchronizing with each pulse, extreme accuracy in the timing components is not required.

It has been discovered that header information in bi-phase-mark code and data insertion in Miller code allows the compression of the most data into a unit of time without information interference or ambiguity. Typically, a strobe may be sent out every two thousand microseconds and still allow sufficient transmission time for header and ending pulses, data pulses from 18 RDAU stations of three channels each (or equivalent), necessary guard spaces between data pulses with a little spare time left over.

The twin-lead may be used rather than shielded cable as the transmission medium since the bandwidth requirements are not extreme. This is not only an economic and handling advantage over the heavier and bulkier shielded cable, but even if large lengths of twin-lead are left on the ground after use, the expense is minimal.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiments thereof which are illustrated in the appended drawings, which drawings form a part of this specification. It is to be noted, however, that the appended drawings illustrate only typical embodiments of the invention and are therefore not to be considered limiting of its scope for the invention may admit to other equally effective embodiments.

IN THE DRAWINGS

Figure 1:
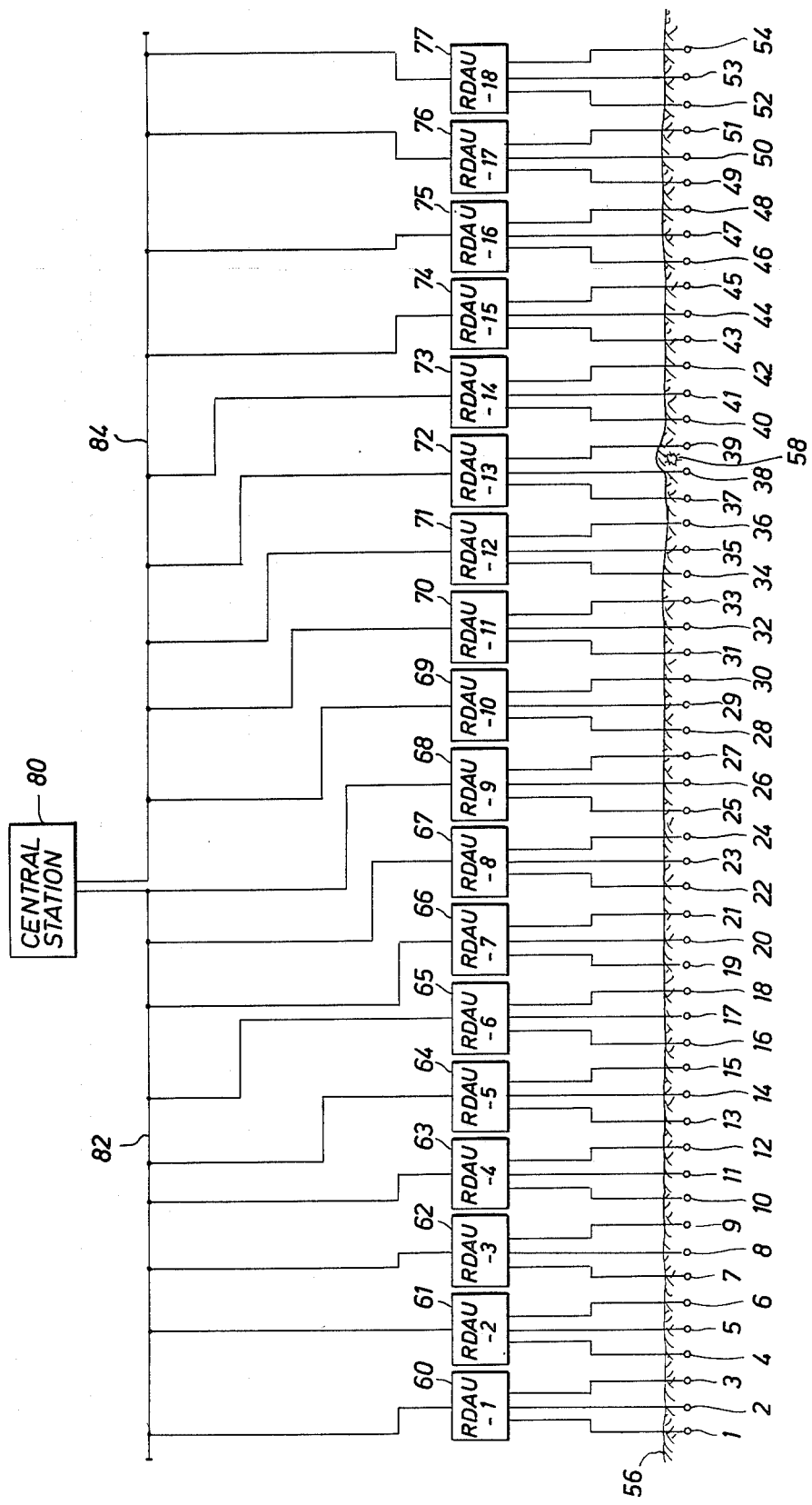

FIG. 1 is an ideal field deployment diagram in accordance with the present invention of a group of geophones used in the popular "roll along" method of seismic prospecting and providing extra channels for "gapping".

Figure 2:
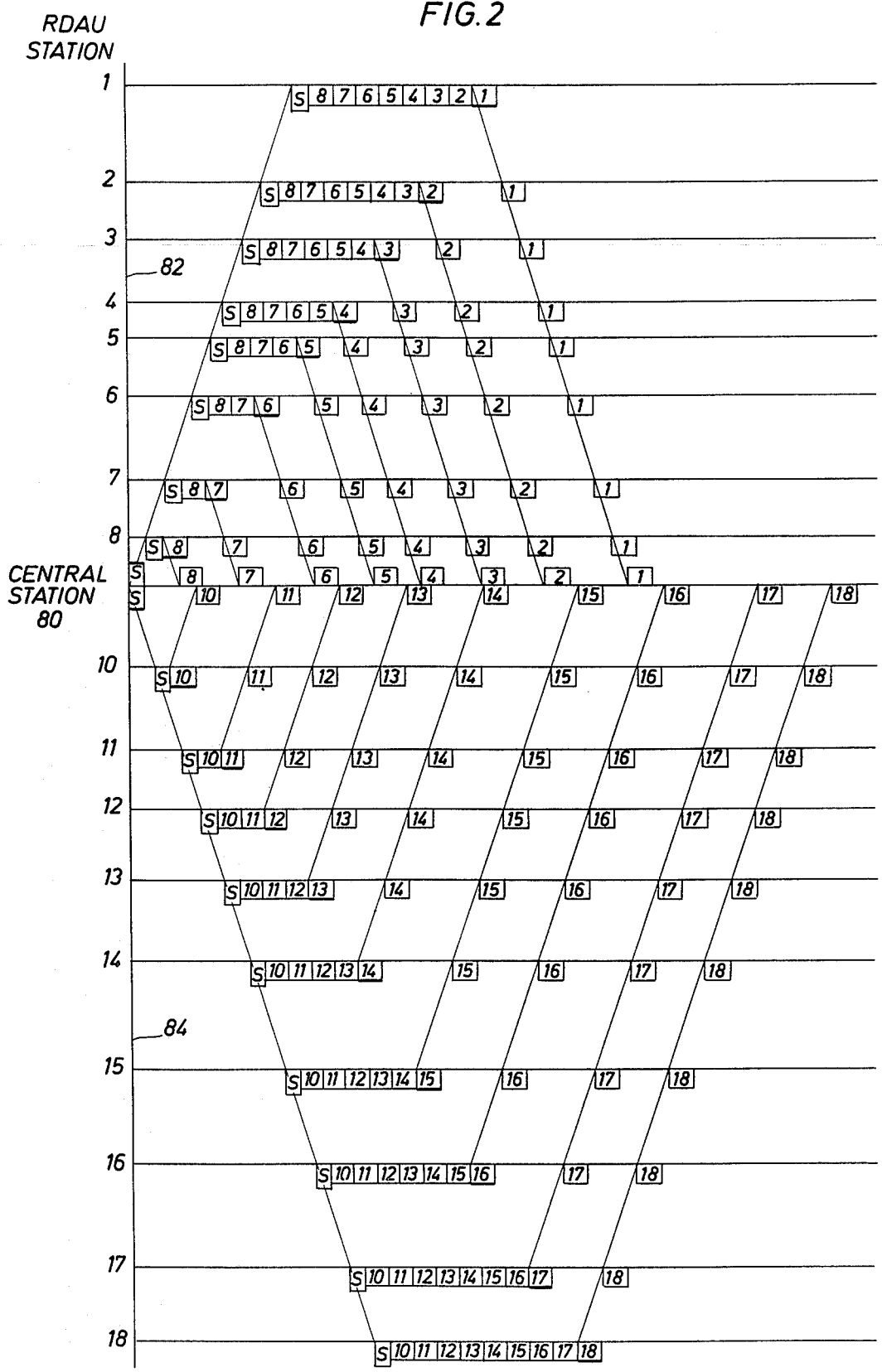

FIG. 2 is a timing diagram illustrating the operation of the system shown in FIG. 1.

Figure 3:
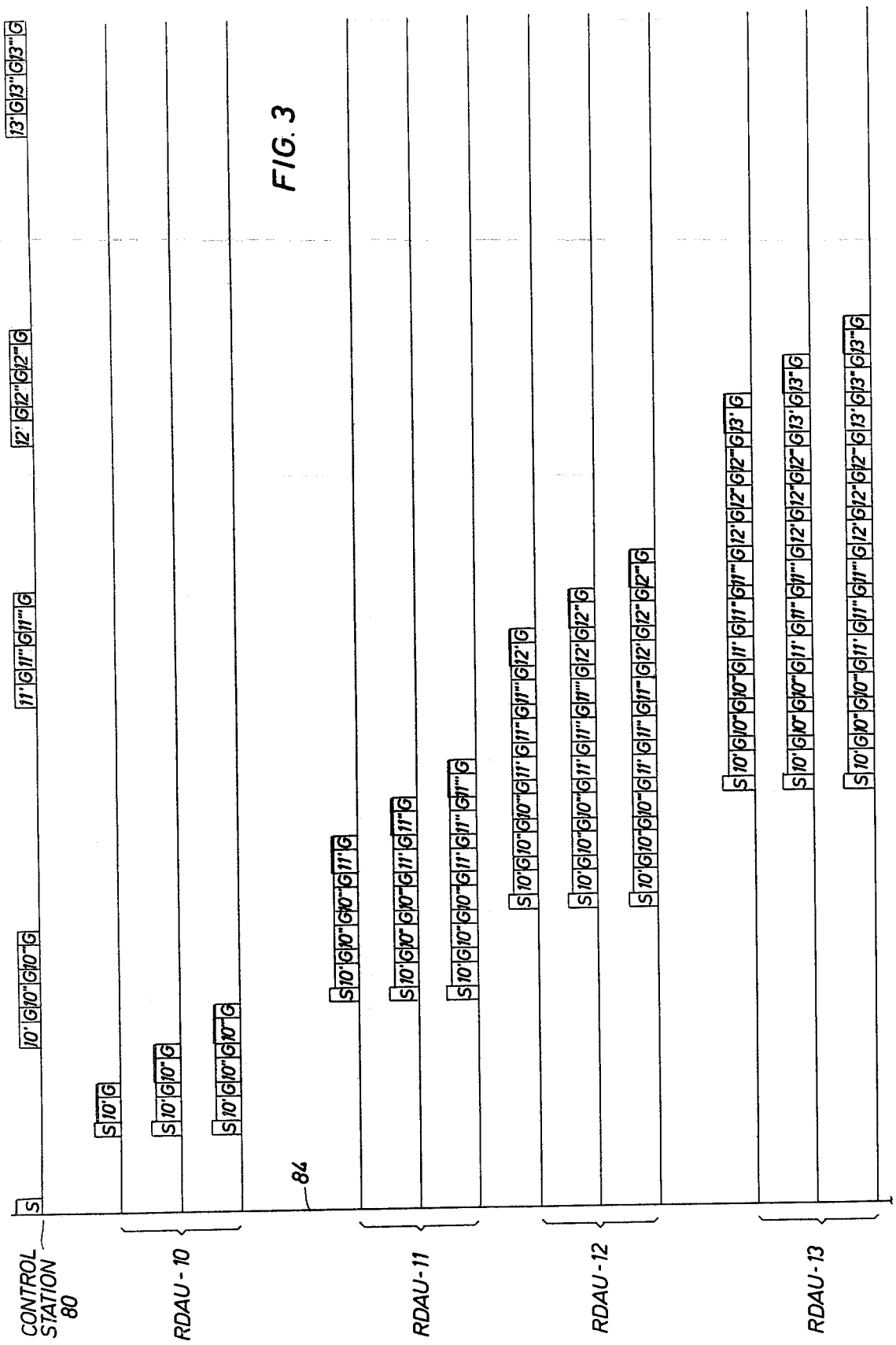

FIG. 3 is an expanded timing diagram of part of the diagram shown in FIG. 2.

Figure 4:
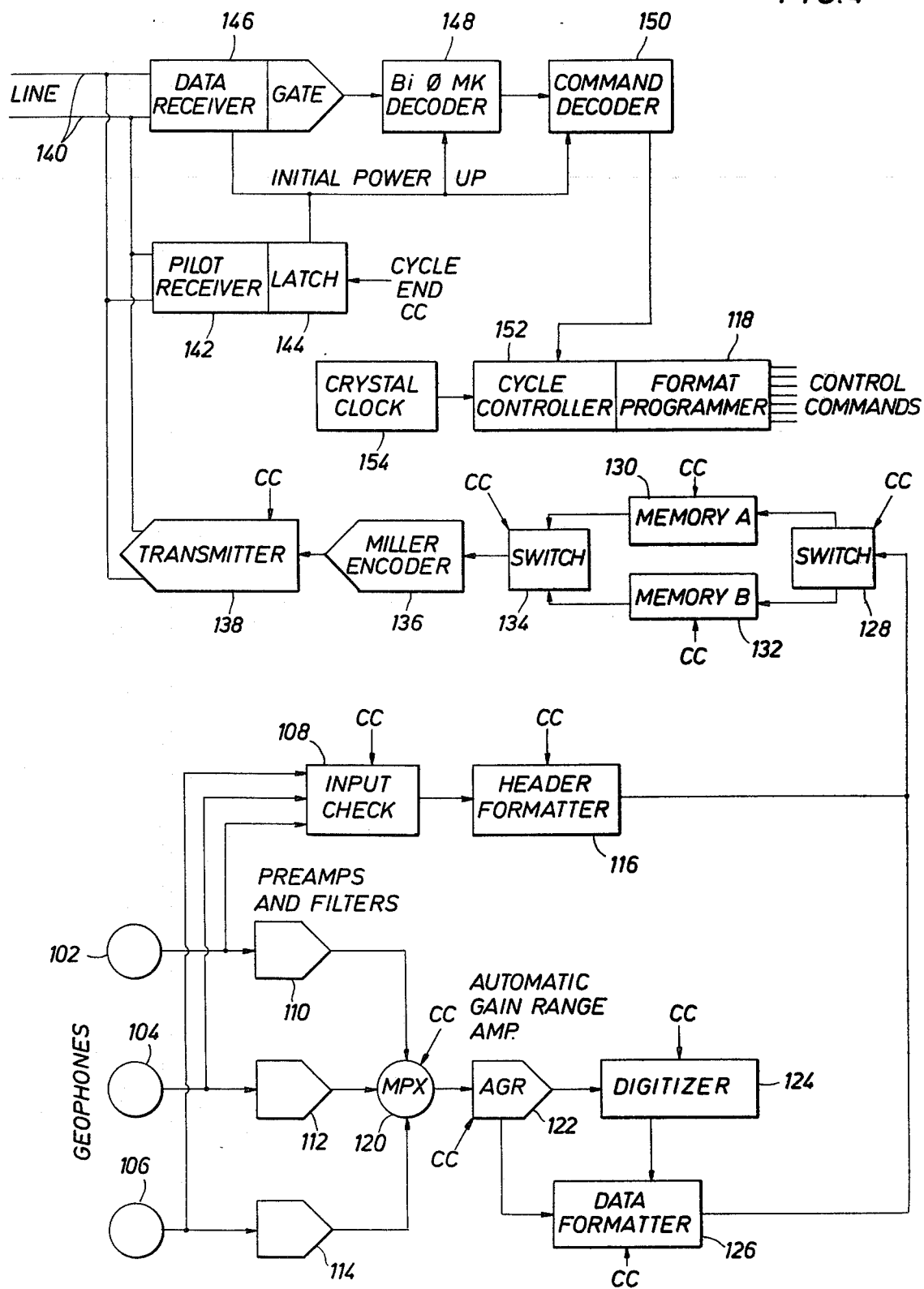

FIG. 4 is a block diagram of a remote data acquisition station in accordance with an embodiment of the present invention.

Figure 5:
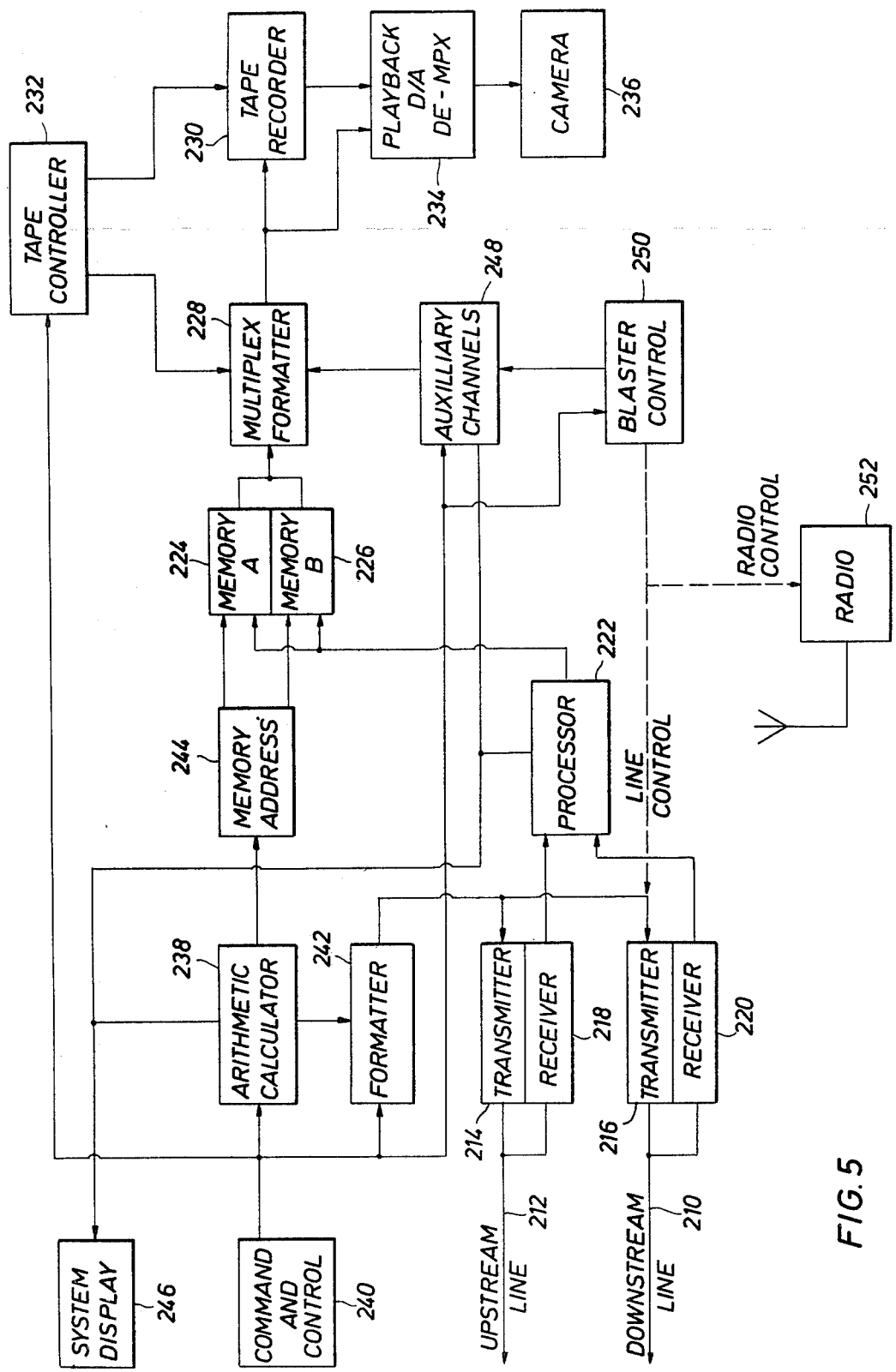

FIG. 5 is a block diagram of a central control and recording station in accordance with an embodiment of the present invention.

DESCRIPTION OF PREFERRED EMBODIMENT

Now referring to the drawings and first to FIG. 1 an example of a typical seismic surveying system is illustrated. Geophones 1-54 are spaced along the terrain 56 at regular intervals, insofar as possible. Each geophone may be an equivalent seismometer or an array, but will be referred to normally hereinafter as merely a geophone.

The string of geophones are also approximately in line with one another, again insofar as terrain 56 will permit.

In performing seismic exploration a number of shot points are located in close proximity with at least a number of the geophone stations, perhaps each station. One such shot point location 58 is shown adjacent geophone 38.

With respect to the surface of the earth, the geophones may be placed on the surface of the terrain, mounted above the terrain or placed in a hole drilled beneath the surface. Likewise, the shot points may be similarly positioned with respect to the earth surface in accordance with the preference of the seismic surveying crew.

Each successive three geophones are connected to a remote data acquisition unit (RDAU) station located in the field. For example, RDAU-1 station 60 is connected to geophones 1, 2 and 3, RDAU-2 station 61 is connected to geophones 4, 5 and 6, and, in like manner, RDAU-3 station 62 through RDAU-18 station 77 are respectively connected to three successive geophones. RDAU-18 station 77 is connected to geophones 52, 53 and 54.

Central record and control station 80 is connected to each of the RDAU stations 60-77 by either one or two transmission lines. If the central station is located near one end of the line (i.e., near RDAU-1 station 60 or RDAU-18 station 77), then only one common transmission line is necessary. In FIG. 1 central station 80 is located near RDAU-8 station 67; therefore, there are effectively two transmission lines connected to central station 80. Upstream transmission line 82 is common to RDAU-1 station 60 through RDAU-8 station 67 and downstream transmission line 84 connects central station 80 to each RDAU-10 station 69 through RDAU-18 station 77. A more complete description of these transmission lines is set out below.

Even though geophones 1-54 are spaced uniformly approximately at equal distances along the line, there is no requirement to connect each of the RDAU stations to transmission lines 82 and 84 at uniform spacings. Therefore, connections are made to these lines whereever it is physically convenient. Now referring to FIG. 2, a simplified time-distance diagram for the system is shown. In this diagram, it is assumed that control station 80 is located at RDAU-9 station. For convenience in this diagram, the station positions are identified by their RDAU numbers. In the diagram, RDAU-9 station is deactivated for recording seismic data.

The FIG. 2 timing diagram corresponds with the block diagram shown in FIG. 1 and therefore stations 1-8 are located upstream of control station 80 and RDAU stations 0-18 are located downstream of control station 80. At each RDAU station there is a remote data acquisition unit comprising a receiver, a crystal-controlled timer or clock, a transmitter and data acquisition and storage means. The data acquired and stored at each RDAU station is sent back to control station 80 along the transmission line to which it is connected following a scan or strobe signal set out from the control station along the transmission line. A single strobe from the control station interrogates and actuates each of the RDAU stations in turn. These RDAU stations may be considered to be randomly disposed along their respective transmission lines. As above described, the actual positioning is dependent on physical conveniences not related to data acquisition.

At control station 80 there are two receivers, one for receiving the signals from the upstream stations and one for receiving the signals from the downstream stations. In the diagram, the heavy bars underneath the signal time slots indicate when data bursts are inserted on the transmission lines.

Assuming that initial set-up and addressing have been established to initiate interrogation or operation of the RDAU stations, a scan or strobe burst S is inserted at control station 80 on both the upstream and downstream transmission lines 82 and 84. The strobe burst propagates along a transmission line, coming first on downstream line 84 to RDAU station 10. At station 10, two basic functions are initiated by receipt of the strobe burst: the RDAU internal clock is synchronized (this is preferably a crystal-control clock capable of control within +0.1 microseconds) and the RDAU time slot counter at the station is started so as to insert at the proper time the RDAU data burst from station 10. Since station 10 is the station nearest control station 80 on the downstream side, the time slot allocated for RDAU data burst from station 10 is the one adjacent to strobe burst S.

In a similar manner, the clock internal to RDAU station 11 assures that the RDAU data burst at that station is inserted on transmission line 84 in the time slot second closest to strobe burst S (i.e., next to the data burst from station 10). At each successive RDAU station 12-18, internal timing operation inserts the data burst from that station at the next successive time slot so that the data burst at station 18 is placed as shown in FIG. 2, namely, after the strobe and the data bursts from stations 10 through 17.

In each case, the internal clock at the station which is interrogated by the receipt of the strobe burst is synchronized and the timing for insertion of the station data burst is initiated. Timing errors are not cumulative, since the timing for each station is independent of the timing at the other stations, only being dependent on the time of receipt of the strobe burst at that station.

In similar fashion to what has been just described, data bursts are inserted at the upstream RDAU stations on transmission line 82, the RDAU station 8 data burst occupying the station time slot nearest to the strobe burst, the RDAU station 7 data burst occupying the next station time slot, and so forth for RDAU stations 6 through 1.

The return propagation of the data bursts from the RDAU station does not interfere with the strobe burst from control station 80 or with the insertion of data bursts so long as the period of elapsed time for RDAU data burst 18 to be initiated and propagated to control station 80 is longer than the time interval between the strobe bursts initiated from control station 80. That is, the period between strobe bursts must be longer than the sum of: the strobe burst, twice the propagation time from the control station to the RDAU station furtherest therefrom, and the total time of the time slots for each of the RDAU data bursts in the direction along transmission line having the greatest number of RDAU stations. Of course, if the control station is located at RDAU stations 1 or 18, the maximum time is defined for the system.

It should be observed that because there are two receivers at the control station, there is no conflict in receiving data bursts from RDAU stations upstream and RDAU stations downstream at overlapping times (e.g., simultaneously receiving data bursts 3 and 14 in the diagram).

Now referring to FIG. 3, a partial, but expanded time-distance diagram is shown. In this instance, RDAU stations 10-13 are shown, all on the downstream side of control station 80. In FIG. 3, time slots are illustrated which are sufficiently long to accommodate not only a data burst from each channel geophone (three to a station), but also a guard time for each channel data burst. Data bursts may be of slightly varying duration for reasons hereafter explained. However, in each case the time slot is the same. Also, a slightly longer time slot as represented by the guard time provides for positive recognition of one data burst from another as they are received at the control station, as well as providing additional means for maintaining separation between the respective station data bursts as they are inserted on the transmission line.

All of the RDAU stations are illustrated for insertion of data bursts from three geophone channels. Each RDAU station has its three geophone data bursts applied in time consecutive order. To accomplish this, internal clocks at the respective RDAU stations are preset so that the data burst from its first channel is inserted in a first time slot, the data burst from its second channel is inserted in the second time slot for that station and the data burst from its third channel is inserted in the third time slot for that station. In effect, the RDAU station is allocated three consecutive time slots, one of which is filled by the data burst from each geophone channel.

Finally, it may be observed that the full electronics at each RDAU station is not needed all of the time. Therefore, for each recording cycle of data, a pilot signal may be sent out to actuate the stations. At other times, the stations may remain dormant except for the operation of a pilot receiver or detector. Such pilot receiver and an accompanying switch has much less power consumption than a full data receiver. After the transmission has been achieved, the transmitter portion also may be turned off until required by operation to be again turned on.

The turning off of the electronics when not needed has an additional benefit to merely saving power consumption. Various noise signals on the transmission line are prevented from inadvertently initiating data burst inserts from the RDAU station out of turn. The station must first be turned on by an appropriate pilot signal and then address programmed by an initial strobe burst before the station is operational from its dormant state. Once activated the station remains so until there is an inordinate gap between strobe bursts. This means the cycle is over and the station should again be dormant.

One active system in accordance with the invention is illustrated in FIGS. 1 and 2. However, in accordance with the need for using the "roll along" method of advancing the active sensor stations while advancing the shot point sequence, a number of inactive RDAU stations may be included in the line of such units, thus allowing considerable physical advance in prospecting using the line without requiring excessive repositioning of the RDAU stations. As already noted, 18 active stations in the system previously described includes provisions for allowing a gap in the sequence of active sensor stations to accommodate terrain or other restrictions and to allow disenabling of one station for a shot point, referred to as allowing for "roll along". One workable configuration including inactive RDAU stations includes 26 RDAU stations (18 active, 8 inactive) each having three geophone channels or seismometer sensors. Another workable configuration includes 20 RDAU stations (14 active, 6 inactive) each RDAU station having four geophone channels. When such a configuration is used 12 of the active RDAU stations are used for the required channel recordings, one is used for "roll along" purposes and one allows for gapping.

As also previously noted, the length of the line needs to be approximately five miles long to be consistent with normal usage of sensor-stations spacing. Increase in this length due to terrain of 6 percent produces a 5.3 mile cable length. A 5.3 mile round trip for signals on the propagation medium which is disclosed hereinafter takes approximately 74 microseconds.

It has been discovered that a bit cell rate of the serial data transmitted from the RDAU stations in a block may conveniently be 640 kHz, although bit rates slightly less than or in excess thereof are equally desirable. A bit cell is the time required to send one bit of data or, in other words, the time between two, voltage transitions, one up and one down. A 640 kHz bit rate has been determined to be well within the bounds imposed by the deterioration of rise time over a 5.3 mile length of transmission line, as that line is hereafter described.

It has been further discovered that the use of Miller coding produces transition spacings at 1, 1½ and 2 bit cell intervals, with 1.5625 microseconds per bit cell.

A discussion of Miller coding is found in Electromechanical Design, dated March 1971, beginning on page 6 Digital Design. In the Miller Code, a transition in the middle of a bit cell represents a one and a transition at the end of or in phase with the first zero's bit cell represents a zero followed by a zero. As further explained in the above referenced article, the Miller Code also requires a "101" sequence to clear the decoder. In order to isolate each successive block with a detectable gap and thus facilitate reassembly of the received data, a detected transition interval of at least 2½ bit cells is required as an inter-block gap. Also ½ bit cell before the first full transition of a block, there is an offset step from zero line voltage that guarantees the next transition (first bit cell center) is detected by the receiver. The ending step that returns the line voltage to zero occurs ½ bit cell after the final bit cell of the block. Thus the start, synchronization, end, and gap functions take up six bit cells of time per active RDAU station transmission.

Data samples of each channel of an RDAU station typically consist of a 4-bit gain code and a mantissa of 14 or 15 bits, depending on a possible line-length/information-capacity tradeoff. At least one odd-parity check bit may be used with each block of data samples. The digitizing for each individual seismic signal to obtain their individual information and handling bits is well known in the art.

Data block format for each RDAU station may thus be expressed for the three-channel-per-RDAU-station system, as follows: 3 bit cells for header information for synchronizing purposes, 57 bit cells for data (i.e., 3×(4+15)), 1 bit cell for block parity and 3 bit cells for end step and gap. This amounts to 64 bit cells per block. As each bit cell is 1.5625 microseconds long, this constitutes 100 microseconds per block. Multiplying 18 active blocks per scan (between storbe burst) this totals 1800 microseconds per scan.

For a four-channel-per-RDAU-station system, 3 bit cells may be used for initial synchronizing, 76 data bit cells (4×(4+15)) may be used for data, 1 bit cell may be used for block parity and 3 bit cells may be used for end step and gap. Multiplying the total of 83 bit cells per block by 1.5625 microseconds per bit cell develops a total of 129.69 microseconds per block. Since there are 14 active channels per scan, this amounts to 1815.6 microseconds per scan.

As previously described, the central station propagates along the transmission line a scan strobe which is received by each RDAU station and used to start the internal operating sequence with each RDAU station. Each RDAU station responds with a new block of data being inserted in its own assigned time slot within the 2 millisecond separation between strobe bursts. The strobe burst may consist of 7.5 bits coded into bi-phase-mark for simplicity for decoding circuits in the RDAU station electronics. Each bit of this code takes 3.125 microseconds, so that the transition spacing is either one or two 1.5625 microsecond intervals. The detected code is thus a 7-bit pseudo-random bit pattern and the total time that is taken is 23.5 microseconds. The time taken by an RDAU station assigned to the first time slot from the scan or strobe burst detection until the start of its data block transmission is the acquisition delay and in a preferred embodiment consists of the following: 15 data bits for multiplex switching and gain determination, 5 bit cells for sample settling prior to holding, 15 bit cells for digitizing bits while holding, 1 bit cell for encoder delay, 2 bit cells for register transfer delays and 0.5 bit cell for internal logic propagation. This amounts to 38.5 bit cells or, at 1.5625 microseconds per bit cell, 60.2 microseconds of acquisition delay.

The strobe burst or scan may be typically on the order of 23.5 microseconds, as hereinafter discussed. A summary of the total scan timing for the three-channels-per-RDAU-station system is as follows: 23.5 microseconds for strobe bursts, 60.2 microseconds for acquisition delay, 1800 microseconds for 18 data blocks with gaps, 74 microseconds for round trip line propagation over 5.3 miles, and 2 microseconds for decoder delay. This amounts to 1959.7 microseconds or 40.3 microseconds of spare time in a 2 millisecond scan interval.

Similarly for a four-channel-per-RDAU-station system, the following summary of scan timing applies: 23.5 microseconds for the strobe burst, 60.2 microseconds for acquisition delay, 1815.6 microseconds for 14 data blocks with gaps, 74 microseconds for round trip propagation over 5.3 miles of transmission line and 2 microseconds for decoder delay. This totals 1975.3 microseconds or allows 24.7 microseconds of spare time in a 2 millisecond scan interval.

If an RDAU station does not receive a strobe within a 3 millisecond scan interval, then it shuts off or becomes dormant, having negligible power drain. A return to "standby" condition with the receiver and controller portions of the electronics active occurs when a low-power pilot receiver or detector circuit senses the presence of a pilot frequency that may be present on the transmission line before the start of the next recording cycle. Detecting the pilot keeps the RDAU stations in "stand-by" until call up is over.

The first strobe of a recording cycle is treated differently from the other strobes by the RDAU stations. This strobe allows inputs to the previously cleared address registers within the RDAU stations to establish the addresses and associated time slot numbers, which together constitute the callup list. the time slot number is retained with the address and is used to determine the delay within each scan that is a multiple of the data block with gap time as required for orderly time multiplexing of the data onto the transmission line, as above described.

The first strobe burst as it advances along the transmission line accumulates a data block with gap for each RDAU station. Each RDAU station may have predetermined the order of its own channel data, so that data block with gap that is inserted for each RDAU station is for the entire station. The address at each subsequent station is determined by how many data blocks with gap (time slots) are used up by the time the first strobe burst and the accompanying signals arrive at that station.

Now referring to FIG. 4, a block diagram of a typical RDAU station is shown. Individual channel geophones or seismic sensors 102, 104 and 106 are applied to input check unit 108 and also respectively to appropriate preamplifiers and filters 110, 112 and 114. Input check unit 108 is connected to header formatter unit 116 and both units 108 and 116 are connected to receive control commands from format programmer 118, for a purpose to be hereafter explained.

The channel preamplifiers and filters are connected to time multiplexer 120, whose output is connected to automatic gain range amplifier 122, which, in turn, is connected to both digitizer 124 and data formatter 126. Units 120, 122, 124, and 126 are all connected to receive control commands from format programmer 118. The seismic signals pass from the time multiplexer and undergo treatment in the gain range amplifier, digitizer and data formatter in a manner well known in the art. Typically, gain information will be in the first four bit cells and the mantissa will be in the next 15 bit cells.

Input check unit 108 and header formatter unit 116, upon control command, monitor the input from the three channel geophones and determine an overall gain code in appropriate format to be associated with the data. Switch 128 receives the header code and the data blocks and alternately allows the data to be stored in memory A 130 or memory B 132. Output switch 134 connected to both memory units permits alternate call up of the information stored in the memory units. Note that units 128, 130, 132 and 134 are all connected to receive control commands from format programmer 118.

The output from switch 134 is applied to Miller encoder 136 and the encoder is connected to transmitter 138, the output of which is connected to transmission line 140.

The illustrated RDAU station is activated by the presence of an enabling signal present on the line which is detected by low power pilot receiver 142, which activates latch 144 for turning on data receiver 146. At the end of the transmission cycle, latch 144 is operated by a control command to turn off the data receiver. Latch 144 also causes power to be applied to bi-phase-mark decoder 148 and command decoder 150.

It may be recalled that the strobe burst is coded in bi-phase-mark code and therefore bi-phase-mark decoder 148 allows data receiver 146 to be sensitive to such a strobe burst for triggering, via the command decoder, cycle controller 152. Cycle controller 152 also receives an input from crystal clock 154. Upon command from decoder 150, it synchronizes the operation of the station by selecting the next appropriate cyclical output from clock 154 and, in accordance with the time delay address of the station, produces via format programmer 118 the control commands at the station.

Cycle controller 152 is programmed with the proper address as described above by receipt of the strobe burst and the accompanying time slotted data from the previous stations. Thereafter, each time a strobe burst is sensed the timing automatically operates to put the data from the station onto the line during the proper time slot, as above discussed.

Now referring to FIG. 5, a block diagram of the central or control and recording station is illustrated. In this diagram, it is assumed that the control station is connected to downstream line 210 and to upstream line 212. Hence, there are two transmitters, 214 and 216, respectively, and two receivers, 218 and 220, respectively. The receivers are connected to processor 222, which, in turn, is connected alternatively to memory A 224 and to memory B 226.

Memory units A and B are connected to multiplex formatter 228, which, in turn, is connected to multiple track tape recorder 230. Both the multiplex formatter and the tape recorder are controlled by tape controller 232.

So that the information recorded on the tape recorder may be played back, tape recorder 230 is connected to play back unit 234 comprising a digital-to-analog converter and demultiplexing unit. Play back unit 234 is then connected to camera 236. So that information data can be taken directly from the multiplex formatter, rather than from the tape recorder, a direct connection is made from multiplex formatter 228 to play back unit 234.

The functional heart of the central or control station is arithmetic calculator 238, which functions as an electronic bookkeeper for the station operator. Calculator 238 is connected to command and control unit 240, by which the operator identifies the RDAU station by number at which the control station is located, the number of the RDAU station closest to the station of the upstream line and whether the RDAU numbers are in ascending or descending sequence (determined by whether the line is moving north or south, for example). Similarly, the operator may identify the number of the RDAU station closest to the station on the downstream line and whether the RDAU numbers are in ascending or descending sequence.

The arithmetic calculator determines which RDAU stations are called up and assigns the proper time slot numbers to each upstream and downstream group via formatter 242, which is connected to each transmitters 214 and 216. Note also that the arithmetic claculator is connected to memory address unit 244, which in turn is connected to memory units 224 and 226.

When rolling one RDAU position, arithmetic claculator 238 automatically advances the number assignment and time slot assignment on command by the operator, or redetermines the RDAU station positioning by the operator reidentifying his beginning RDAU station and upstream closest RDAU station. The system positioning and timing assignments are displayed on system display unit 246 connected to calculator 238 so that the operator has a continual visual description of the deployment of his system.

Arithmetic calculator 238 also furnishes information about the system positioning and timing the memory address unit 244, which uses this information to place each returning data burst in the proper place in a random access memory, either memory A or memory B, thus performing the "remapping" function. While the data is being stored in memory A, the previous memory B is read out of the memory, remultiplexed from a 54 to a 48 channel system and recorded on tape. Note that command and control unit 240 is connected to auxiliary channels unit 248. This connection determines which of the six active channels are not used at a particular time. Note also that auxiliary channels unit 248 is connected to system display 246 to provide a complete visual presentation of the system, including stations which are found included in the multiplex recording at any one time.

Blaster control unit 250 is connected to command and control unit 240 so that impulses may be sent by radio 252 to trigger the source shots. Alternatively, the blaster control signals may be sent via a transmitter along suitable transmission lines, the blaster control signal being time shared coordinated with the strobe signals sent from the control station in the manner previously described. Perhaps different lines are used to trigger the shots. If not, the blaster control signals would be coded so as to actuate the shots, but so as not to actuate the RDAU stations until the proper delay and the subsequent transmission of the strobe burst is transmitted for that purpose.

Transmissions lines used in seismic signal transmission in the prior art have been shielded co-axial cables capable of carrying a wide frequency spectrum and shielded against interference from outside disturbances. Use of frequency multiplexing, even of digital signals, requires wide band capability.

However, such cables are expensive, heavy and for long-range transmission have fairly high attenuation, on the order of 15 db per mile. Such high attenuation requires the use of booster amplifiers or repeaters when used in the transmission line on the order of the lengths referred to above.

It has been discovered that compared to a 50-ohm co-axial cable, a twin lead, such as used for television antenna systems, has superior characteristics. These twin leads normally carry two parallel copper conductors, each about 0.07–0.08 inches in diameter, separated by about 0.4–0.5 inches. The cover for the conductors is typically insulated polyethylene. Many ruggedized twin leads are on the market capable of withstanding the pulling, whipping and twisting that a twin lead would be subjected to in use as transmission lines 82 and 84.

A twin lead exhibits about a 0.9 db loss for one mile, a 1.8 db loss for two miles, a 4.7 db loss for five miles, and a 9.4 db loss for ten miles.

Reflections from a terminated end varies from $-30$ db to $-32$ db, depending on the value of the termination. Optimum terminating resistance for the line has been discovered to be 285 ohms, although any value between 275–300 ohms is totally acceptable.

When the line is reeled out, it rests on rocks, sand, dirt, bushes and even hangs from tree limbs. The effect of varying materials adjacent to the line produces a noise on the line caused by minute reflections of these points where the material changes (from rocks to trees, for example). The noise varies from $-32$ to $-42$ db. In addition, two lines running parallel to each other for a distance of five miles and separated by 25 feet will produce cross talk between the two lines of $-31$ db. Such a parallel line may be a nearby power transmission line located in the area. In either event, the characteristics of the twin lead is suitable so that the systematic noise levels are still far below those which are a result of attenuation of the line. For example, the receiver detection level may be set at $-18$ db and the transmitted signal applied to the line at 25 volts peak-to-peak. As stated above the signal level at five miles will only be down 4.7 db, well detectable by the receiver and capable of filtering or other discrimination from the systematic noises.

The central or control station operator can test the integrity of the transmission line with an ohm meter. The resistance of the line is 60 ohms per loop mile and hence with foreknowledge of the length of his line, he can determine whether or not the line has any breaks. Line breaks are readily located visually or may be located by making resistance measurements along the line. Field splicing of a line break of the twin lead is quite simple and requires only about 30 seconds.

While particular embodiments of the invention have been shown, it will be understood that the invention is not limited thereto since many modifications may be made and will become apparent to those skilled in the art.

What is claimed is:

1. A telemetry system for coupling data from a plurality of geophones distributed on the surface of the earth to a recording system comprising:
    a plurality of randomly disposed remote data acquisition units each having; at least one geophone input adapted for connection to a geophone, a first port adapted for connection to a twin-lead transmission line, and signal processing means connected to said geophone input and to said port for, in response to receipt of an interrogation signal at said first port, generating a digital data word representing a signal present at said geophone input and, after a preselected unique time delay, coupling the digital data word to said first port,
    a single twin-lead transmission line connected to said first port of each of said randomly disposed remote data acquisition units, and a central data receiving station having; a second port connected to said transmission line; an output adapted for connection to a recording system; interrogation means for applying an interrogation signal to said second port; and receiving means coupled to said second port and to said output for receiving data from said remote data acquisition units and coupling said data to said output, wherein the source of said data is identified by the time lapse between sending of an interrogation signal and receipt of a particular data word.

2. A telemetry system according to claim 1 wherein sad signal processing means includes a memory for storing an indication of said preselected unique time delay.

3. A telemetry system according to claim 2 wherein said memory is programmable, further including, in said central data receiving station, time slot programming means coupled to said second port for programming said memory whereby said unique time delay is preselected for each remote data acquisition unit.

4. A telemetry system according to claim 1 wherein each remote data acquisition unit has two or more geophone inputs, and digital data words representing signals present on each input are coupled in sequence to said first port.

5. A telemetry system according to claim 1 wherein said signal processing means includes a clock for determining said preselected unique time delay and a transmitter connected to said first port for inserting said digital data word onto said transmission line.

6. A telemetry system according to claim 1 wherein each data acquisition unit includes a pilot receiver switch for shutting off power to said acquisition unit except to said pilot receiver switch when there is an absence of an interrogation signal on said transmission line for a substantial period of time, and for supplying power to said acquisition unit in response to a signal from said central station.

7. A telemetry system according to claim 1 wherein said interrogation means applies at least a second interrogation signal on said transmission line and wherein each data acquisition unit includes two memories alternately actuated for storing digital data words and for transferring digital data words to said first port upon receipt of successive interrogation signals.

* * * * *